US012106781B2

(12) United States Patent
Kaufmann et al.

(10) Patent No.: US 12,106,781 B2
(45) Date of Patent: Oct. 1, 2024

(54) CUTTER UNIT FOR CUTTING A PHONOGRAPHIC RECORD, CARTRIDGE FOR A CUTTER UNIT, BLANK FOR A PHONOGRAPHIC RECORD AND METHOD FOR READING INFORMATION FROM A BLANK

(71) Applicant: PHONOCUT MASCHINEN GMBH, Vienna (AT)

(72) Inventors: Florian Kaufmann, Solothurn (CH); Steve Knuchel, Biel (CH); Mario Weiss, Biel (CH); Martin Sigrist, Biel (CH)

(73) Assignee: PHONOCUT MASCHINEN GMBH, Vienna (AT)

( * ) Notice: Subject to any disclaimer, the term of this patent is extended or adjusted under 35 U.S.C. 154(b) by 0 days.

(21) Appl. No.: 18/042,623

(22) PCT Filed: Aug. 23, 2021

(86) PCT No.: PCT/EP2021/073289
§ 371 (c)(1),
(2) Date: Feb. 23, 2023

(87) PCT Pub. No.: WO2022/043270
PCT Pub. Date: Mar. 3, 2022

(65) Prior Publication Data
US 2023/0360669 A1    Nov. 9, 2023

(30) Foreign Application Priority Data
Aug. 25, 2020  (CH) ........................... 1055/20

(51) Int. Cl.
*G11B 3/02*    (2006.01)
*G11B 3/72*    (2006.01)

(52) U.S. Cl.
CPC . *G11B 3/02* (2013.01); *G11B 3/72* (2013.01)

(58) Field of Classification Search
CPC .................................. G11B 3/02; G11B 3/72
See application file for complete search history.

(56) References Cited

U.S. PATENT DOCUMENTS

| 1,269,696 | A | * | 6/1918 | Fletcher | G11B 3/70 369/277 |
| 2,528,826 | A |   | 11/1950 | Hanson et al. | |
| 2,716,551 | A |   | 8/1955 | Bachman | |
| 2,864,896 | A | * | 12/1958 | Lauterslager | G11B 3/00 369/85 |
| 2,867,694 | A |   | 1/1959 | Pearson, Jr. | |
| 2,948,783 | A |   | 8/1960 | Scully | |
| 3,125,344 | A | * | 3/1964 | Immendorf | G11B 3/00 83/875 |
| 3,528,665 | A | * | 9/1970 | Horst | G11B 3/72 369/127 |
| 3,711,658 | A | * | 1/1973 | Ward | G09B 5/04 369/85 |

(Continued)

*Primary Examiner* — William J Klimowicz
(74) *Attorney, Agent, or Firm* — Rankin, Hill & Clark LLP

(57) ABSTRACT

A cutter unit for carrying a cutter for cutting a phonographic record includes a cutter carrier and a cutter head. The cutter head is carried by the cutter carrier and arranged to be displaced relative to the cutter carrier, in particular to rotate around a cutter pivot, the cutter unit being arranged in a cartridge enclosing and protecting the cutter unit.

14 Claims, 5 Drawing Sheets

(56) References Cited

U.S. PATENT DOCUMENTS

| | | | | |
|---|---|---|---|---|
| 3,835,262 | A | * | 9/1974 | Moritz ............... G11B 3/72 |
| | | | | 369/153 |
| 3,850,436 | A | * | 11/1974 | Rabe ................. G11B 3/72 |
| | | | | 369/279 |
| 3,938,810 | A | * | 2/1976 | Pradervand ........ G11B 3/70 |
| | | | | 369/126 |
| 3,973,325 | A | * | 8/1976 | Vespo ............... G11B 3/72 |
| | | | | 33/27.09 |
| 3,988,025 | A | * | 10/1976 | Nagamura .......... H04R 9/16 |
| | | | | 369/136 |
| 4,105,213 | A | * | 8/1978 | Owaki ............... G11B 3/44 |
| 4,121,836 | A | * | 10/1978 | Cheeseboro ....... G11B 27/11 |
| 4,157,460 | A | * | 6/1979 | Bottali .............. G11B 3/00 |
| | | | | 369/47.37 |
| 4,178,489 | A | | 12/1979 | Lippel et al. |
| 4,317,192 | A | | 2/1982 | Castle |
| 4,441,177 | A | | 4/1984 | Groh et al. |
| 5,003,522 | A | | 3/1991 | Dolby |
| 5,781,525 | A | * | 7/1998 | Neulinger ......... G11B 19/2009 |

\* cited by examiner

CUTTER UNIT FOR CUTTING A PHONOGRAPHIC RECORD, CARTRIDGE FOR A CUTTER UNIT, BLANK FOR A PHONOGRAPHIC RECORD AND METHOD FOR READING INFORMATION FROM A BLANK

BACKGROUND OF THE INVENTION

Field of the Invention

The invention relates to the field of mechanical cutting of phonographic records. It relates to a cutter unit for cutting a phonographic record, a cartridge for a cutter unit, a blank for a phonographic record and a method for reading information from a blank.

Description of Related Art

Cutting devices for cutting phonographic records are generally known in the recording industry. Professional cutting lathes are used for creating master discs from recordings or in direct-to-disc recording sessions. They are generally expensive and must be handled and adjusted by professionals. Hobby level phonograph recorders lathes are available, but of inconsistent quality.

U.S. Pat. No. 2,528,826 discloses a recording device having an adjustable advance ball. An advance ball is a round-ended pin or ball that is carried on a cutter head close to the cutting stylus (or simply cutter). The advance ball rests upon and rides on the disk as the disk is rotated, keeping the cutter at a constant distance to the disk. The cutter projects below the level of the advance ball, and thus the elevation of the advance ball relative to the tip of the cutter height controls the depth of the cut. A mechanism for adjusting this elevation is presented, in which an adjustment screw sets the height of the advance ball. Furthermore, the position of the advance ball relative to the cutter, projected onto the plane of the record, can be varied. This allows to adapt the device to cutting from the inside out or from the outside in while avoiding the chip cut by the cutter to interfere with the advance ball.

U.S. Pat. No. 4,441,177 discloses a stylus protection mechanism for phonographs. It is arranged to move the stylus into a protective zone in the event of a lateral deflection of the stylus.

U.S. Pat. No. 4,178,489 discloses a cutter head rotatably suspended on a cutter arm, with a counterweight and an electrical DC motor for applying a torque to the cutter arm. An input to the motor is based on an audio signal to be cut and on the position of the arm, measured by a Hall element.

U.S. Pat. No. 2,716,551 discloses a cutter head arranged on a cutter arm rotating about a first axis, with an advance ball arranged to rotate about a second axis different from the first axis, with a viscous lubricant applied at a bearing corresponding to the second axis.

U.S. Pat. No. 4,317,192 discloses a cutterhead with a suspension velocity control apparatus provided for preventing damage due to the suspension assembly descending to fast. The cutterhead includes an air puck designed to float above a master disc being cut, and an adjustment mechanism for the vertical position of a stylus assembly relative to the air puck. The cutter head is supported by a parallelogram suspension with two steel springs.

U.S. Pat. No. 2,867,694 discloses a recording head for disc records, with a tracking stylus running in a guiding groove controlling the radial position of a cutting stylus. The relative vertical position of the two styluses can be adjust-ed. The cutting head is a complete unit that can be attached to the tone arm of a record player without the need to remove the existing reproducer stylus. U.S. Pat. No. 4,157,460 is directed to a modulation system and discloses an advance ball mechanism.

U.S. Pat. No. 5,003,522 discloses a reproducing system for compensating for mechanical imperfection of a disc, such as record warp and rumble. A variety of mechanisms for tracking the disc surface is presented, including gliders similar to an advance ball of a cutting lathe.

SUMMARY OF THE INVENTION

It is a possible object of the invention to create a cutter unit for cutting a phonographic record that is suited for direct-to-disc recording and is robust and can be operated by a non-professional user.

It is a possible object of the invention to create a cartridge for a cutter unit that is suited for direct-to-disc recording and is robust and can be operated by a non-professional user.

It is a possible object of the invention to create a blank for a phonographic record and a method for reading information from a blank.

These objects are achieved by a cutter unit for cutting a phonographic record, cartridge for a cutter unit, a blank for a phonographic record and a method for reading information from a blank according to the corresponding claims.

The cutter unit serves for carrying a cutter for cutting a phonographic record, the cutter unit including a cutter carrier and a cutter head, the cutter head being carried by the cutter carrier and arranged to be displaced relative to the cutter carrier, in particular to rotate around a cutter pivot, the cutter unit being arranged in a cartridge enclosing and protecting the cutter unit.

As a result, the cutter unit can be removed from a recording machine in which it is used. Delicate key components are protected by the cartridge. If they need to be adjusted, or if the cutter needs replacement, the cartridge as a whole can be removed and sent to a professional workshop. Furthermore, the recording machine can be upgraded by exchanging just the cartridge.

The displacement of the cutter head relative to the cutter carrier can be implemented in different ways. According to different embodiments, for example:
  the cutter head is arranged to rotate relative to the cutter carrier around a cutter pivot;
  the cutter head is arranged to translate, that is, to be linearly displaced relative to the cutter carrier by means of a linear joint or linear bearing;
  the cutter head is arranged to move, relative to the cutter carrier, along a trajectory combining rotation and translation.

In each case, the bearings can be slide bearings or roller bearings or compliant bearings (or flexure hinges or solid joints). In embodiments, the relative movement is defined by a mechanical linkage, for example, a four bar linkage, in particular a parallelogram linkage.

In embodiments, the cutter head carries an advance ball for maintaining a constant distance between the cutter and a recording medium, a height of the advance ball relative to the cutter being adjustable by an adjustment mechanism, the adjustment mechanism including an advance ball carrier carrying the advance ball, the advance ball carrier being mounted to be adjustably displaced relative to the cutter head, and in particular to rotate, relative to the cutter head, around an advance ball carrier pivot.

The displacement of the advance ball carrier relative to the cutter head, and corresponding bearings, can be implemented in different ways, as described for the cutter head relative to the cutter carrier.

In embodiments, the cutter head is arranged to rotate relative to the cutter carrier around a cutter pivot, the advance ball carrier is mounted to rotate, relative to the cutter head, around an advance ball carrier pivot, and an axis of rotation of the cutter pivot and an axis of rotation of the advance ball carrier pivot are at a right angle to one another.

Generally, the two axes do not lie in the same plane. Then the angle between the axes is defined as the angle between a first one of the axes and a projection of the second one of the axes onto a plane running through the first axis and in parallel to the second axis. As a result, when the cutting depth is changed by the adjustment mechanism, it remains essentially independent of the rotation of the cutter head around the cutter pivot.

In embodiments, the adjustment mechanism includes an adjustment element, in particular an adjustment screw, and a mechanical linkage linking a displacement of the adjustment element to a displacement of the advance ball, wherein the linkage reduces the displacement by a reduction factor of at least two, in particular of at least three, in particular of at least four.

In other words, the reduction factor is the displacement of the adjustment element divided by the displacement of the advance ball. This allows to precisely control the displacement of the advance ball, and thus of the cutting depth, even with a small adjustment screw or other adjustment element.

In embodiments, the cutter head is displaceable relative to the cutter carrier by cutting forces acting on the cutter and/or a weight of the cutter head, this weight being counteracted by at least one of a counterweight and a cutter spring, the cutter spring being in a pre-stressed state.

In embodiments, the cutter head is rotatable around the cutter pivot by cutting forces acting on the cutter and/or a weight of the cutter head, this weight being counteracted by at least one of a counterweight and a cutter spring, the cutter spring being in a pre-stressed state, and in particular wherein the cutter spring acts on a counter arm opposite to the cutter head, relative to the cutter pivot.

The spring can be dimensioned to be in a pre-tensioned state when mounted in the cutter carrier. It acts at an attachment point, at which the cutter spring pushes a counter arm, downward, counteracting the weight of the cutter head, the cutter pivot acting as a fulcrum. When the cutter head is in or above a rest position, or lower angular stop position, the torque exerted by its weight pulling downward is partially balanced by the torque exerted by the cutter spring pushing downward on the counter arm.

The cutter spring is designed to be relatively long in relation to the maximum displacement that the attachment point experiences in normal operation of the device. Consequently, the displacement of the attachment point, and thus the difference in the length of the spring, is relatively small, and the force exerted by the spring does not change significantly when the cutter head is displaced from its rest position.

In an alternative embodiment, the cutter spring acts on the same side as the cutter head, relative to the cutter pivot, and is thus pre-stressed to pull the cutter head upward, countering the cutter head's weight. In this embodiment, the counter arm need not be present. In other embodiments, with the cutter spring acting on the same side as the cutter head, or on the counter arm, the counter arm can carry a counterweight or be shaped to act as a counterweight to the cutter head. In further embodiments, only such a counterweight is present, and no cutter spring.

The cutter spring can be, for example, one of a helical spring, a leg spring or a torsion spring.

In embodiments, a length of the cutter spring and its arrangement in relation to the cutter head is designed for the length of the cutter spring to change, when the cutter head is displaced between its two stop positions, in particular, when it rotates around the cutter pivot between its angular stop positions, by less than twenty-five percent, in particular less than ten percent, in particular less than five percent.

In terms of forces involved, a maximum displacement of the cutter head, in particular rotation of the cutter head to the largest possible angle, at which the cutter spring is in its most extended state in the cutter carrier, changes the counterforce by less than by less than twenty-five percent, in particular less than ten percent, in particular less than five percent of its value at the smallest displacement, or angle, at which the cutter spring is in its most compressed state in the cutter carrier.

In embodiments, the cutter unit includes a cutter spring regulation element, in particular a regulation screw arranged to displace, relative to the cutter carrier, an end portion of the cutter spring that is opposite the attachment point.

This allows to regulate a length of the cutter spring and thereby to regulate the force with which the cutter head pushes against the record blank when cutting. This is the force exerted by the advance ball and cutter against the blank, with the cutter head being between and not in contact with its upper and lower stop positions.

In embodiments, a net torque exerted by the cutter spring and the weight of the cutter head in an orientation in which it is designed to operate corresponds to a force acting against the advance ball and cutter of between 0.1 N and 0.5 N.

This assumes that the cutter head is not in one of its stop positions. The force is also the force with which the cutter head pushes against the record blank when cutting. This in turn is the sum of a force exerted by the cutter and a force exerted by the advance ball against the blank. In embodiments, the force exerted by the cutter lies between 0.1 N and 0.2 N. In embodiments, the force exerted by the advance ball lies between 0.25 N and 0.5 N.

In embodiments, the cutter unit includes a cutter head displacement sensor arranged to detect a change in the displacement of the cutter head relative to the cutter carrier. In embodiments in which the cutter head rotates, the displacement sensor can be an angle sensor.

The cutter head displacement sensor can be used to control the distance between the cutter unit relative to the blank. This allows to automatically adapt the height of the cartridge to a thickness of the blank. A corresponding method for adapting a position of the cutter unit to a thickness of a blank arranged to be cut by the cutter includes the steps of
    moving the cutter unit towards the blank until the cutter unit comes into contact with the blank, and thereby moves the cutter head relative to the cutter carrier;
    detecting this movement by means of a cutter head displacement sensor; and either stopping movement of the cutter unit towards the blank, or controlling the position of the cutter unit based on sensor values from the cutter head displacement sensor to reach a given relative displacement of the cutter head relative to the cutter carrier.

The cutter unit coming into contact with the blank typically happens by the advance ball and/or the cutter coming into contact with the blank.

Given a measurement of the position of the cutter unit, the head displacement sensor can also be used to measure a thickness of the blank. For a blank including a region of varying thickness, it can also be used to measure the variation in thickness. The variation in thickness can encode information. The encoded information can pertain, for example, to one or more of a material of the blank, or a type of the blank, or a manufacturer of the blank.

In embodiments, the cutter head is arranged to rotate relative to the cutter carrier around a cutter pivot, and a distance between the cutter pivot and a cutting point of the cutter is between ten cm and two cm, in particular between seven cm and three cm, in particular between five cm and three and a half cm.

In embodiments, a cutter bearing implementing the displacement between the cutter head and the cutter carrier, in particular a cutter pivot, includes a bearing, in particular a pivot, that is free of play and a damping function that is realized by a friction of the bearing or pivot. This can be, for example, spring-loaded conical slide-contact bearings, in particular with an adjustable pre-tension force.

In embodiments, a bearing implementing the cutter pivot includes a bearing, in particular a pivot, with low internal friction, such as a roller bearing or a compliant bearing, combined with a separate damping element.

This allows for bearings that are free from play (or clearance-free) and have a damping characteristic, due to friction.

The cartridge is preferably for a cutter unit as described herein, wherein the cartridge includes a first housing section and second housing section movable relative to one another by operation of a locking element, also called locking knob, the cutter being arranged to move with the first housing section, and movement of the locking element in a first direction causing the cutter to protrude from the second housing section in an operational position, and movement of the locking element in a second direction, opposite to the first direction, causing the cutter to withdraw into the second housing section into a protected position.

This implements a cutter protection function, protecting the cutter from being damaged when the cartridge is not in the operational configuration.

In embodiments of the cartridge, movement of the locking element in the first direction causes one or more locking protrusions to extend out of the cartridge, and movement of the locking element in the second direction causes the one or more locking protrusions to withdraw into the cartridge.

When the cartridge is placed in the cartridge carrier, the locking protrusions protrude into corresponding openings or locking slits of the cartridge carrier, thereby locking the position of the cartridge relative to the cartridge carrier when it is in the operational configuration.

In embodiments, the cartridge includes a cutter carrier carrying a cutter head, the cutter head in an operational configuration being movable relative to the cutter carrier, and further with movement of the locking element in the first direction causing a transport protection projection to unblock movement of cutter head relative to the cutter carrier; and movement of the locking element in the second direction causing the transport protection projection to block movement of cutter head relative to the cutter carrier.

This implements a transport protection function, preventing movement of the cutter head when the cartridge is not in the operational configuration.

In embodiments, the cartridge includes at least one detent preventing relative movement between the first housing section and second housing section, the at least one detent including a section protruding from the cartridge, and the detent being releasable by pushing the protruding section inwards.

The detent can be released by sliding the cartridge into the cartridge carrier. This implements a locking function, preventing a user from inadvertently bringing the cartridge into the operational configuration outside the cartridge carrier.

The blank for a phonographic record, is a flat disc and includes on at least one side an annular region in which a height of the surface of the blank varies with angular location, with variations in the height representing a height signal, the height signal encoding information associated with the blank.

In embodiments, the annular region is located at an outer periphery of the blank.

In embodiments, the annular region is located in an inner region of the blank, inside a recording region in which a recording groove is to be cut in the blank.

The method for reading information from a blank optionally uses a cutter unit as described herein, and includes the steps of:

moving the blank and the cartridge, in particular the cutter unit, relative to one another to a radial position corresponding to a radius of the annular region;

rotating the blank relative to the cartridge, in particular relative to the cutter unit, and measuring a height signal encoded in the annular region;

extracting the information from the height signal.

In embodiments, measuring the height signal includes the step of:

the cutter head resting on the blank in the annular region and measuring the displacement of the cutter head relative to the cutter carrier, thereby measuring the height signal encoded in the annular region.

In embodiments, measuring the height signal includes the step of:

measuring the height signal encoded in the annular region by means of a distance sensor that is part of the cartridge, in particular of the cutter unit.

In embodiments, the distance sensor is a non-contact sensor. In other embodiments, the distance sensor is in mechanical contact with the blank as it rotates, and is mechanically displaced by the blank. The distance sensor can comprise, for example, a probe tip that glides on the surface of the blank, or a roller that rolls on the surface of the blank.

The cutter unit presented herein can be implemented as part of a cartridge as presented herein, or independently of such a cartridge.

The cartridge presented herein can be implemented including a cutter unit as presented herein, or independently of such a cutter unit.

Further preferred embodiments are evident from the dependent patent claims.

BRIEF DESCRIPTION OF THE DRAWINGS

The subject matter of the invention will be explained in more detail in the following text with reference to preferred exemplary embodiments which are illustrated in the attached drawings, which schematically show.

DETAILED DESCRIPTION OF THE INVENTION

In principle, identical parts are provided with the same reference symbols in the figures.

Figure 1:
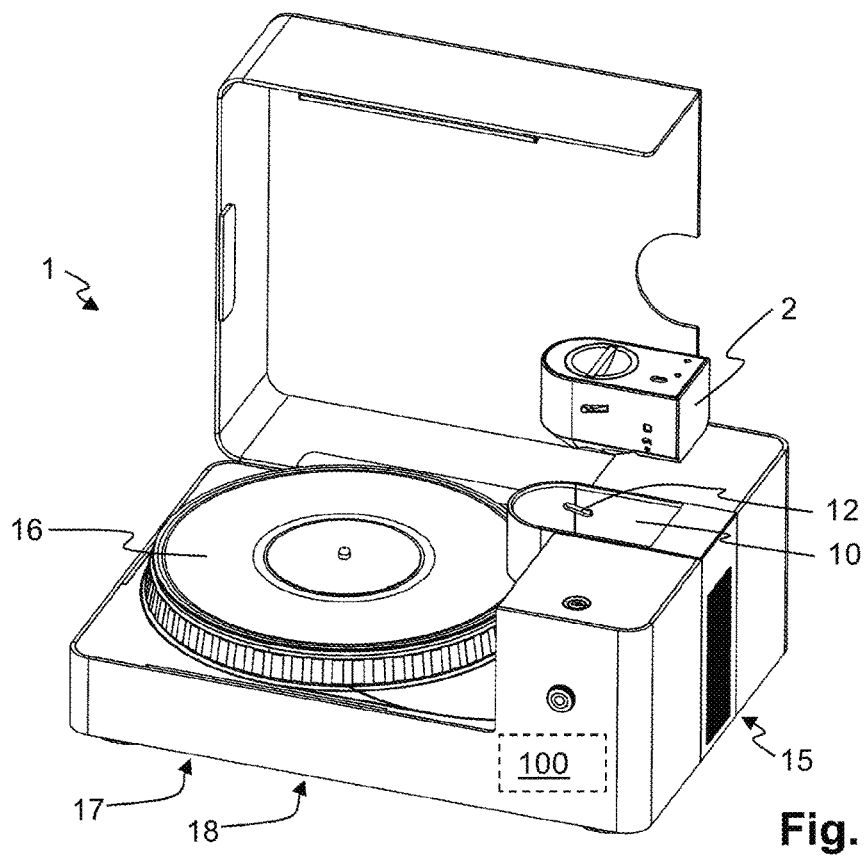
FIG. 1 a recording machine.

FIG. 1 shows a recording machine 1. It includes a turntable 16 for carrying a record blank 9, and driven by a turntable drive 17. A cartridge 2 including a cutter unit 3 is removably arranged in a cartridge carrier 10. The cartridge carrier 10 is movable in a vertical direction relative to the turntable 16 by a carrier drive 15. The turntable 16 is movable in a horizontal direction relative to the cartridge 2 by a turntable displacement drive 18. Actuation of the drives and reading and processing of sensor values from sensors in the cartridge 2 and sensors associated with the drives and user input elements is done by a control unit 100, typically using a microprocessor. Audio signals can be processed by digital and/or analogue electronics.

Note: when the description makes reference to "horizontal" and "vertical", then this refers to a state when the recording machine 1 is operated with the blank 9 lying in a horizontal plane. However, the invention can also be implemented with the recording machine 1 being oriented differently, for example with the blank 9 lying in a vertical plane. In such cases, the recording machine 1 can be modified to have e.g. springs to replace the force of gravity where needed, in particular for pressing the cutter head 4 against the blank 9.

In order to record an audio signal on the blank 9, the control unit 100 controls the turntable displacement drive 18 to move the turntable 16 so that the cutter unit 3 can begin cutting at a starting radius of the blank 9. It controls the carrier drive 15 to lower the cartridge carrier 10 towards the blank 9 until it reaches a cutting height, which can, for example, be detected by means of a sensor in the cartridge 2. In this way, it can also determine the height of an upper surface of the blank 9, and thus a thickness of the blank 9. In order to cut a groove corresponding to the audio signal in the blank 9, the control unit 100 controls the cartridge 2 to be at a cutting height, the turntable drive 17 to turn the turntable 16, and the turntable displacement drive 18 to slowly move the turntable 16 so that a spiral groove is cut, while the audio signal is used to control a displacement of a cutter 6 in two dimensions—corresponding to a stereo signal—by means of two drives arranged in the cutter unit 3.

The delicate components that need to be precisely adjusted are arranged in the cartridge 2. The cartridge 2 can have a size of, for example, a height and width of less than ten centimetres each, and a length of less than fifteen centimetres. In on embodiment, the height and width are six centimetres each, and the length is less than eleven centimetres.

Figure 2:
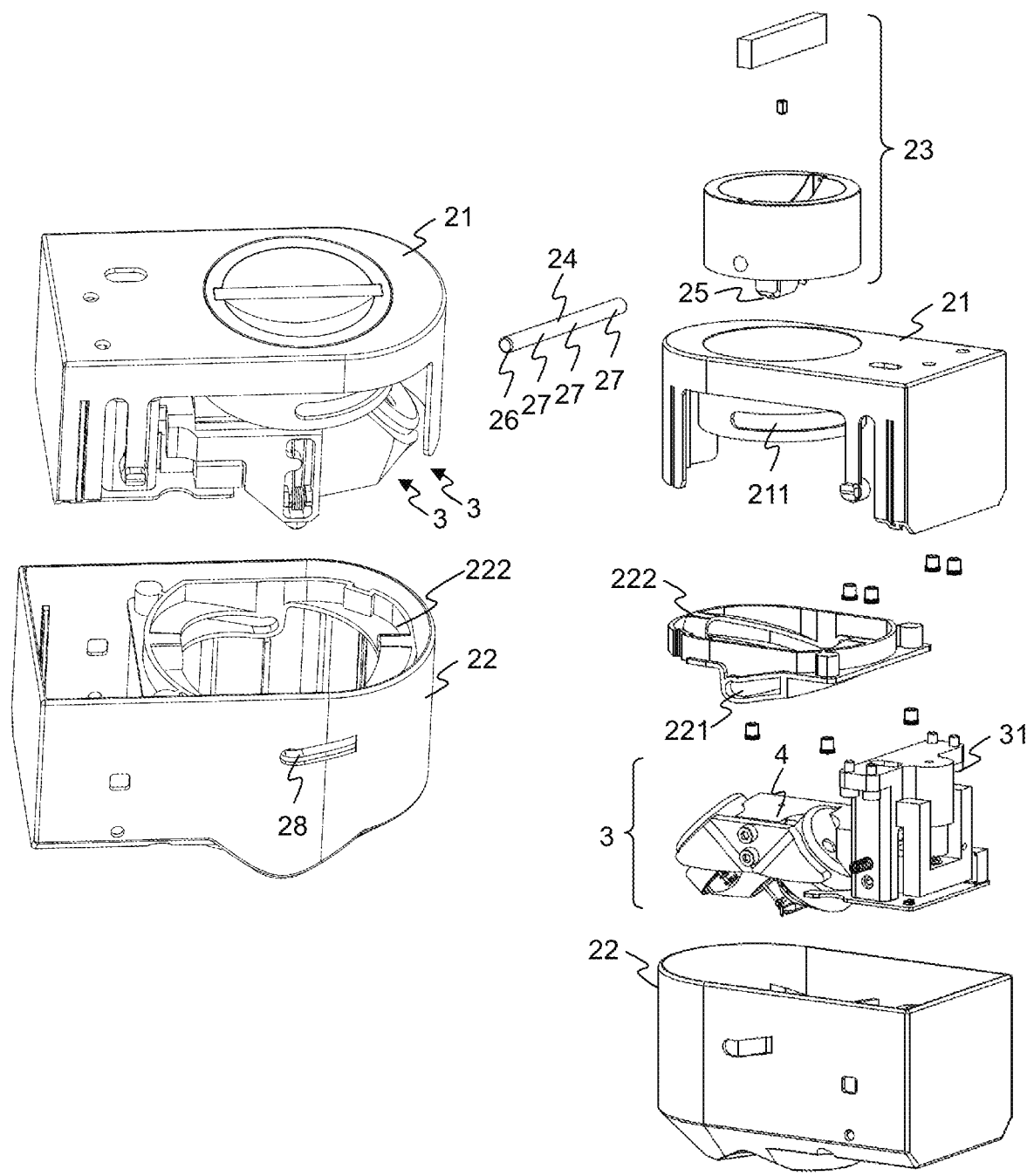
FIG. 2 a cartridge including a cutter head, to be used in the recording machine.

FIG. 2 shows exploded views of the cartridge 2. The cartridge 2 includes two main sections that are arranged to slide relative to one another in a linear movement. A top section includes a first housing section 21 and a cutter unit 3. The cutter unit 3 includes a cutter carrier 31 rigidly attached to the first housing section 21, and a cutter head 4 that can pivot relative to the cutter carrier 31 around a horizontal axis, for following variations in the height of the blank 9 during cutting. A locking element or knob 23 is arranged in the first housing section 21 to rotate around a locking knob 23 axis. A bottom section includes a second housing section 22 and a follower part 222 rigidly attached to one another.

The locking element shown here is arranged to be rotated and thereby affect further elements, as described below. In other embodiments, not illustrated, the locking element is a lever arranged to be rotated, or a push button or a slider arranged to be linearly displaced by a user.

A locking pin 24 is arranged in the locking knob 23 and rotates with it around the locking knob 23 axis. The locking pin 24 passes through a horizontal slit 211 of the first housing section 21, keeping the locking knob 23 at the same position relative to the first housing section 21, seen along the locking knob 23 axis. The locking pin 24 also passes through one or more inclined, helical followers 221 of the follower part 222. A section of the locking pin 24 acts as a cam 27 interacting with the one or more followers 221. This causes, upon rotation of the locking knob 23, the follower part 222 and the second housing section 22 to be linearly displaced in parallel to the locking knob 23 axis.

Figure 3:
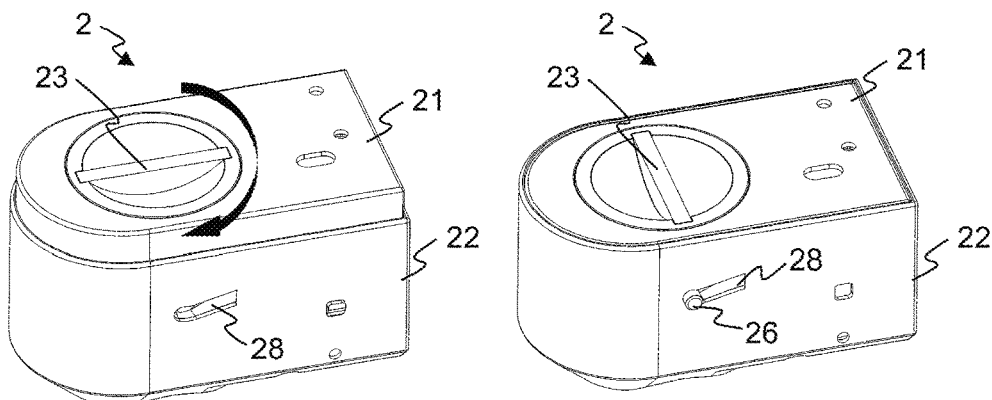
FIGS. 3-5 transport and operational configurations of the cartridge.
Figure 4:
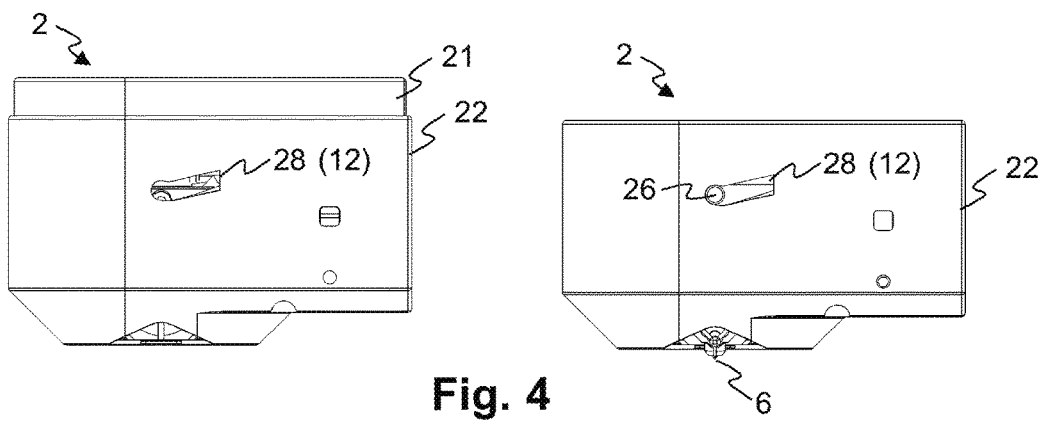

This movement is illustrated in FIG. 3 and FIG. 4. In a non-operational or transport configuration (left in each figure), the second housing section 22 is extended to protect the cutter 6. Turning the locking knob 23 ninety degrees clockwise brings the cartridge 2 in an operational configuration (right in each figure), in which the cutter 6 sticks out from the second housing section 22.

In these two figures it further is shown that one or both outer tips of the locking pin 24 act as locking protrusions 26: upon rotation of the locking knob 23, they protrude out of the cartridge 2, through a locking opening 28 of the second housing section 22, and lock into a locking slit 12 of the cartridge carrier 10, locking the cartridge 2 in an operating position in the cartridge carrier 10. The shape of the locking slit 12, at least around the location of the locking protrusions 26 in the operational configuration, corresponds essentially to the shape of the locking opening 28 when the cartridge 2 is placed in the cartridge carrier 10.

Figure 5:
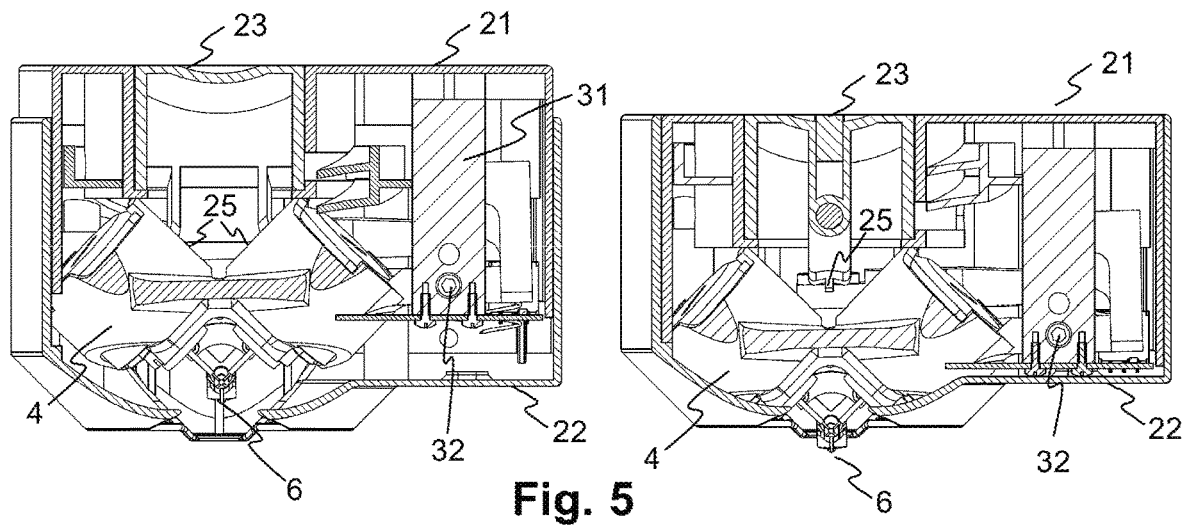

FIG. 5 shows a further function related to operation of the locking knob 23: as will be explained in more detail below, the cutter unit 3 includes a cutter head 4 that can pivot relative to a cutter carrier 31. The locking knob 23 includes a transport protection projection 25 interacting with the cutter head 4: in the transport configuration (left in the figure), the transport protection projection 25 blocks movement of the cutter head 4 out of one of its stop positions. In the operational configuration (right in the figure), by being rotated relative to the cutter head 4, the transport protection projection 25 does not block movement of the cutter head 4.

Figure 6:
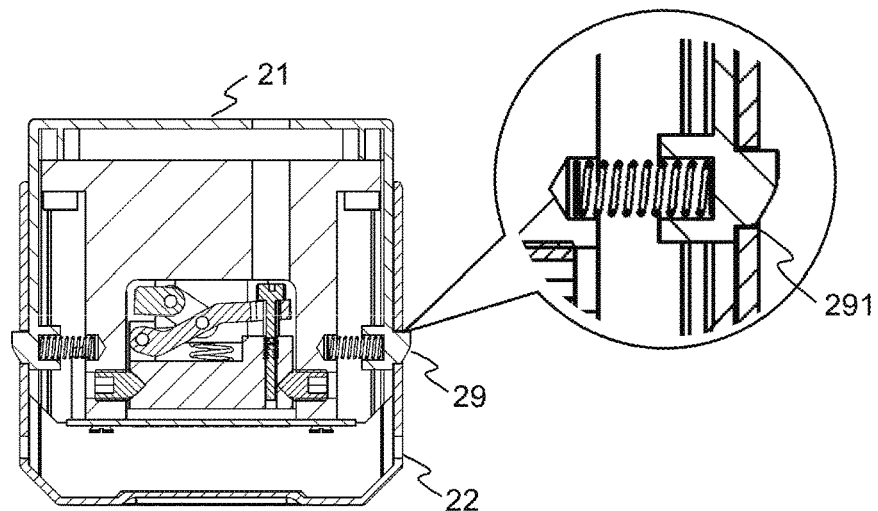
FIG. 6 a detent for locking the cartridge in a transport configuration.

FIG. 6 shows a sectional view of the cartridge 2, illustrating a safety mechanism preventing movement between the first housing section 21 and second housing section 22 unless the cartridge 2 is placed in the cartridge carrier 10: at each side of the cartridge 2, a detent 29 with a catch 291 is arranged to impede relative movement between the first housing section 21 and second housing section 22. A part of the detent 29 projects outward of the cartridge 2. When the cartridge 2 is placed in the cartridge carrier 10 this part is pushed towards the inside of the cartridge 2, and the catch 291 blocking movement of the second housing section 22 is released.

In summary, according to embodiments, the cartridge 2 cannot be inadvertently brought from the transport to the operational configuration. This is possible only when it is inserted in the cartridge carrier 10, and then involves unlocking the transport protection of the cutter head 4, withdrawing the second housing section 22 so that the cutter 6 protrudes from the second housing section 22, and locking the cartridge 2 to the cartridge carrier 10 by means of the locking protrusions 26.

Figure 7:
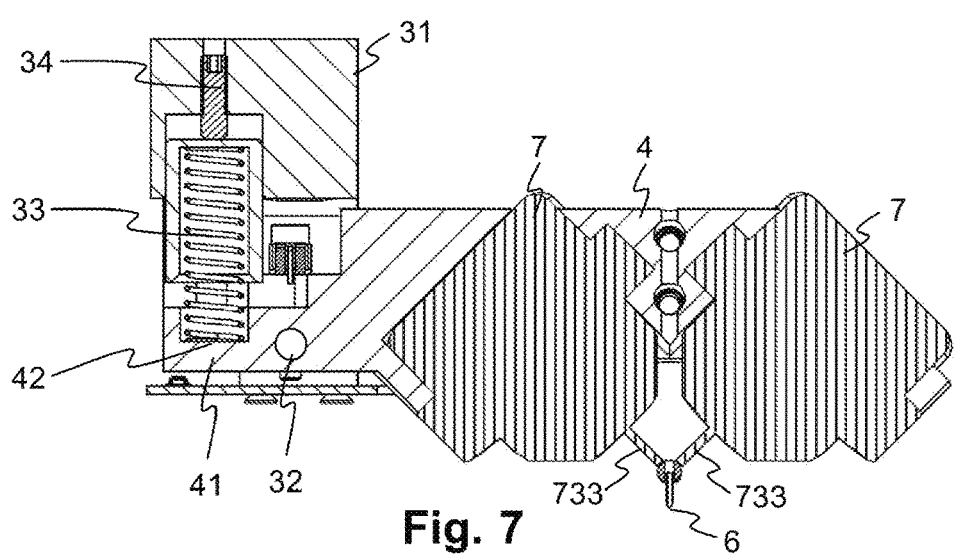
FIG. 7 a cutter unit.

FIG. 7 shows the cutter unit 3 in more detail. The cutter head 4 is arranged to rotate relative to the cutter carrier 31 around a cutter pivot 32. The figure shows the cutter head 4 in a lower stop position, pulled downward by the weight of the cutter head 4. A counter arm 41 on the side opposite to the cutter head 4 is pushed down at an attachment point 42 by a cutter spring 33. The spring force acting on the counter arm 41 counterbalances the weight of the cutter head 4 to a certain degree, such that a net force exerted downward be the cutter head 4, when cutting, is within a specified range.

This range corresponds to, for example, a net weight of twenty to fifty grams, corresponding to approximately 0.2 N to 0.5 N. This can be divided between a cutter force of between 0.1 N and 0.2 N and an advance ball force of between 0.25 and 0.5 N.

The cutter spring 33 is adjustable by a cutter spring regulation element 34 that allows to move the end of the cutter spring 33 that is attached to the cutter carrier 31, thereby lengthening or shortening the length of space in which the cutter spring 33 extends, and thereby changing a pre-tension of the cutter spring 33.

In operation of the cartridge 2, the height of the cutter unit 3 above the blank 9 is adjusted, e.g. by raising or lowering the cartridge carrier 10 via the carrier drive 15, such that the rotation of the cutter head 4 is between a lower stop position and an upper stop position. Then the cutter head 4 is free to move up and down, following variations in the height of the blank 9 as it rotates and the groove is cut.

The length of the cutter spring 33 is relatively long when compared to the deflection of the attachment point 42 as the cutter head 4 moves up and down under normal operation of the cartridge 2. As a result, the counterforce with which the cutter spring 33 pushes down changes only to a small degree.

FIG. 7 also illustrates an arrangement of voice coil drives 7 driving the cutter 6. The two voice coil drives 7 are arranged to modulate movement of the cutter 6, each via a respective force transmitting shaft 733, in orthogonal directions, for cutting a groove 93 encoding a stereo audio signal. The voice coil drives 7 are part of the cutter head 4 and move with the cutter head 4. As the groove 93 is cut, the height of the cutter 6 is adapted to variations of the height of the blank 9 by an advance ball 5, causing the cutter head 4 to rotate around the cutter pivot 32.

Typically, the depth of the groove is less than fifty micrometres, in particular around forty micrometres. The width of the groove is twice its depth.

Figure 8:
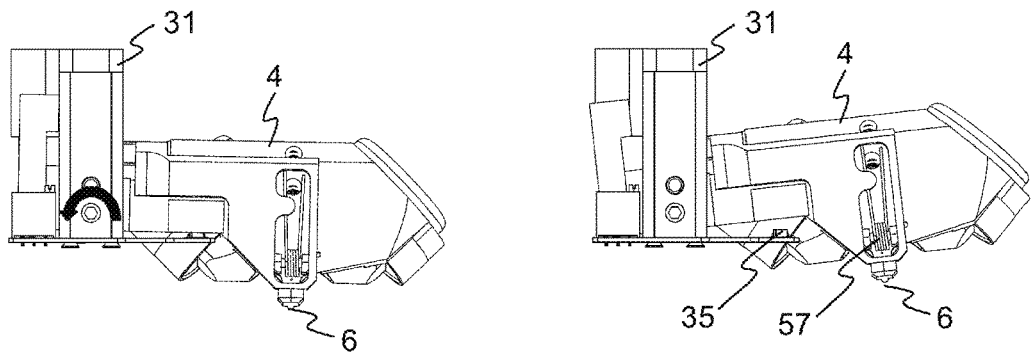
FIG. 8 details of the cutter unit.

FIG. 8 shows the cutter head 4 in a lower stop position relative to the cutter carrier 31, and rotated upward around the cutter pivot 32. The relative position or displacement, in this case an angle, is detectably by a cutter head displacement sensor 35. The cutter head displacement sensor 35 can be, for example, a magnetic, optical, inductive, or capacitive sensor. The cutter head displacement sensor 35 can provide an analogue or a digital value representative of the displacement or angle of rotation, respectively. Using this sensor, the carrier drive 15 can lower the cartridge carrier 10 onto the blank 9 until the cutting head 4 comes into contact with the blank 9 and thereby is raised relative to the cutter carrier 31. This change in displacement of the cutter head 4 can be detected by the cutter head displacement sensor 35, and the movement towards the blank 9 can be stopped. If the cutter head displacement sensor 35 provides a digital sensor value, indicating that the displacement has exceeded a threshold, a simple on-off height controller for the distance of the cutter unit 3 relative to the blank 9 can be implemented. If the cutter head displacement sensor 35 provides an analogue distance or displacement or angle value, a continuous or quasi continuous height controller for the distance of the cutter unit 3 relative to the blank 9 can be implemented. Such a height controller normally is used to set an initial height of the cutter unit relative to the blank. Then, when cutting the blank 9, the height of the cartridge carrier 10 and thus the cartridge 2 is not changed, and variations in the height of the blank 9 are absorbed by the cutter head 4 pivoting around the cutter pivot 32 against the force of the cutter spring 33.

In embodiments, the recording machine 1 and in particular the carrier drive 15 is configured to determine the position of the cartridge carrier 10 and thus of the cartridge 2 relative to the recording machine 1 and thus relative to the turntable 16. This allows to determine the thickness of the blank 9 placed on the turntable 16.

In embodiments, the recording machine 1 is configured to determine, in this way, the thickness, of a blank, and/or to determine whether a blank is present at all.

In embodiments, the recording machine 1 is configured to measure the height of the blank 9 in an annular code region 94 of the blank 9, by rotating the blank 9 at a speed at which the height controller can follow variations in the height of the blank 9.

In embodiments, a width of the code region 94 is at least one millimeter and less than 20 mm, in particular less than 10 mm, in particular less than 5 mm, and variations in the height of the code region 94 lie between 0.05 mm and 0.3 mm, in particular between 0.1 mm and 0.2 mm.

In other embodiments, not illustrated, information representing a code associated with the blank or a type of the blank is represented by one or a combination of:

An optical code, such as a bar code or two-dimensional code. This includes codes that are visible only in the infrared or ultraviolet range. Such codes can be printed on a label attached to the blank.

An RFID tag. Such a tag can be embedded in the blank or be part of a label.

Optically or magnetically active particles embedded in or covering the blank or a label. Such particles can be evenly distributed over the blank or label, and thereby can represent a low amount of information, such as a type of the blank. Alternatively, such particles can form a pattern on the blank and thereby encode more information. Optically active particles can be fluorescent under visible light or UV light.

Figure 9:
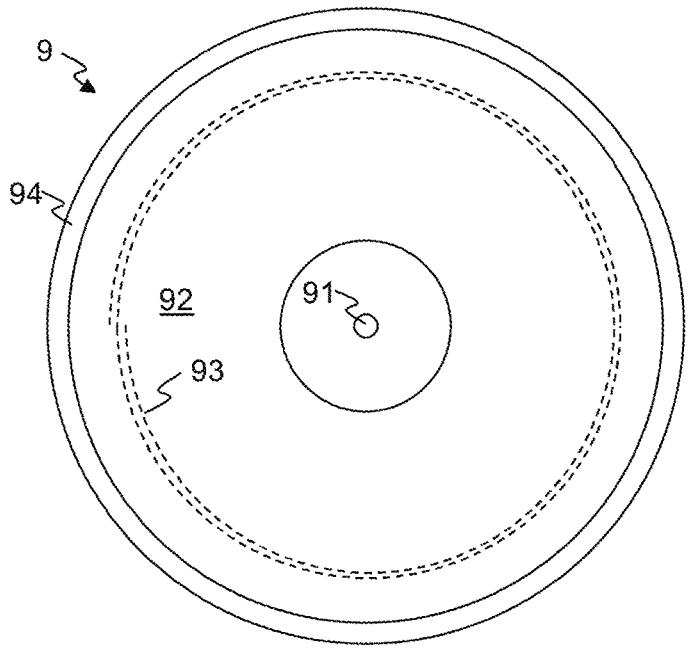
FIG. 9 a blank for recording a phonographic signal.

FIG. 9 shows a blank 9 of a phonographic record, with a centre hole 91, a recording region 92 in which a groove 93 is to be cut, and a code region 94. The code region 94 is shown at the outer periphery of the blank 9, but could, in other embodiments, also be located radially inside the recording region 92.

A blank 9 can thus be manufactured with information represented by variations of the height of the blank's surface in the code region 94. The information can be read from the blank 9 as described above, by rotating the blank 9 on the turntable 16 and tracking its height in the code region 94 with the cutter head 4. The height can be determined from readings of the cutter head displacement sensor 35. In embodiments, the height is determined using the height controller to continuously adjust the height of the cartridge carrier 10 by means of the carrier drive 15, based on feedback from the cutter head displacement sensor 35.

The information can represent an analogue signal, or a digital information coded as an analogue signal. The information can represent one more of the material of the blank 9, a type of the blank, which in turn can be associated with a material and/or quality of the blank, or a manufacturer of the blank.

This information can be used, typically by the control unit 100, to identify, for example, a type or material of a the blank 9, and based on this, do one or more of
- rejecting the blank 9, that is, not performing any cutting on it (for example, if the cutter 6 is not compatible with a material of the blank 9).
- keeping track of the number of blanks 9 of one or more types having been cut, and based on this, determining a need for maintenance or replacement of the cartridge 2 and in particular of the cutter 6.
- conditioning drive signals that drive the movement of the cutter in function of an audio signal, with the manner of conditioning depending on a property of the blank 9, in particular of the material of the blank 9.

Figure 10:
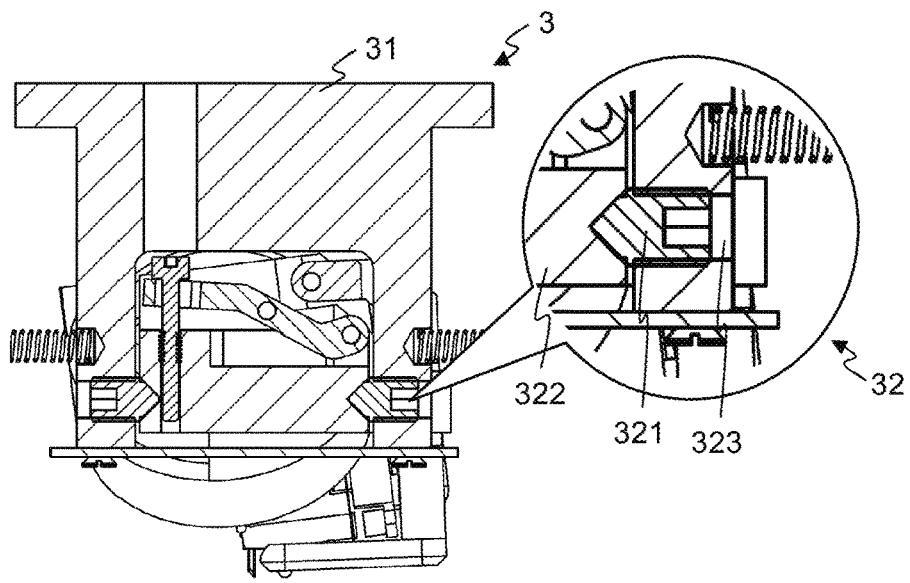
FIG. 10 details of a cutter pivot.

FIG. 10 shows details of the cutter pivot 32: it is implemented by two conical friction bearings, each including a conical pin 321 in a conical seat 322. The bearing can be spring-loaded. A bearing force adjustment section 323 can be present, for adjusting a pre-stress of the bearing. For example, this can be a screw in combination with a spring, shown only schematically.

In other embodiments, not illustrated, the bearings are implemented by rolling bearings, in particular with additional damping elements. In other embodiments, not illustrated, the bearings are implemented by flexure hinges (solid joints, compliant mechanisms), in particular with additional damping elements.

Figures 11, 12:
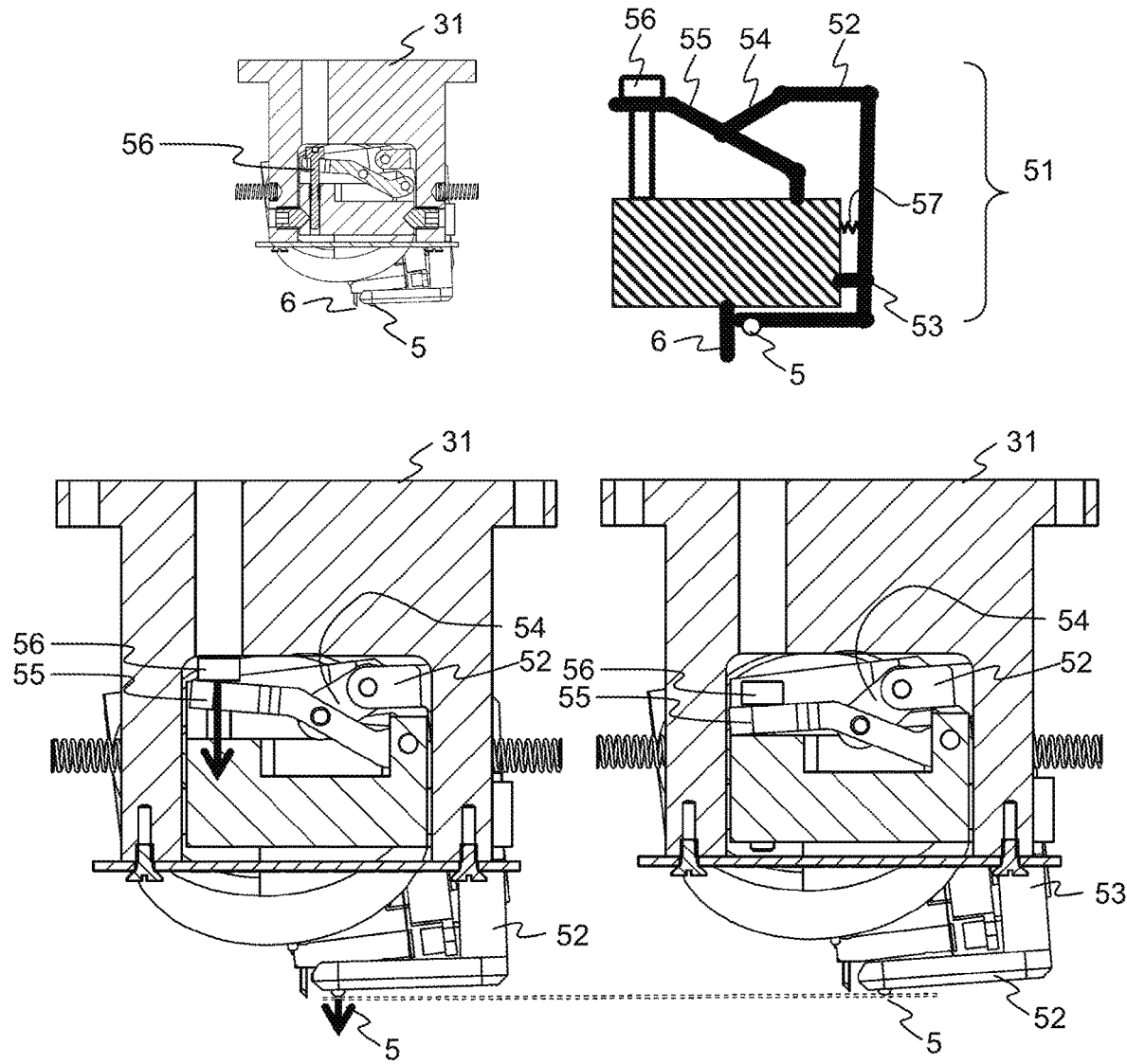
FIG. 11 details of an advance ball carrier linkage.
FIG. 12 axes of rotation of the cutter pivot and the advance ball carrier linkage.

FIG. 11 shows different views of an adjustment mechanism for adjusting the relative height of an advance ball 5 with respect to the cutter 6. The cutter 6 is attached to a body of the cutter head 4. The body carries a linkage 51 that reduces a movement of an adjustment screw 56 to a smaller movement of the advance ball 5. The advance ball 5 is arranged on an advance ball carrier 52 which is linked, via a connecting link 54, to a first link 55, whose position is controlled by the adjustment screw 56. A tensioning spring 57 acts on the advance ball carrier pivot 53 to generate a torque in the same direction as the advance ball 5 does when resting on the blank 9. The tensioning spring 57 ensures that the linkage 51 operates without play. The adjustment mechanism allows to correct for deviations in the relative height of the cutter 6 and advance ball 5 from a design value, caused by manufacturing tolerances.

The linkage 51 reduces a linear displacement of the adjustment screw 56 by a reduction factor of at least two, in particular of at least three, in particular of at least four. That is, the displacement of the advance ball 5 is smaller by this factor. The lower two representations in FIG. 11 show the difference in height of the advance ball 5 for two extreme positions of the adjustment screw. The two corresponding heights of the advance ball 5 are represented by dotted lines. Other mechanical linkages, with different geometries but according to the same principle, can be used to implement such a reduction.

FIG. 12 shows the relative orientation of the cutter pivot 32 and the advance ball carrier pivot 53, being at a right angle to one another. It also shows that the advance ball carrier 52 is shaped to pass around the arrangement of the voice coil drives 7. Due to the right angle, variations in the angle of the cutter head 4 around the cutter pivot 32 do not significantly affect the cutting depth as adjusted by the advance ball height.

While the invention has been described in present preferred embodiments of the invention, it is distinctly understood that the invention is not limited thereto, but may be otherwise variously embodied and practised within the scope of the claims.

The invention claimed is:

1. A cartridge comprising a cutter unit for carrying a cutter for cutting a phonographic record,
   the cutter unit comprising a cutter carrier and a cutter head,
   the cutter head being carried by the cutter carrier and arranged to be displaced relative to the cutter carrier,
   the cutter unit being arranged in the cartridge enclosing and protecting the cutter unit,
   the cutter head carrying an advance ball for maintaining a constant distance between the cutter and the phonographic record, a height of the advance ball relative to the cutter being adjustable by an adjustment mechanism, the adjustment mechanism comprising an advance ball carrier carrying the advance ball, the advance ball carrier being mounted to be adjustably displaced relative to the cutter head, and to rotate, relative to the cutter head, around an advance ball carrier pivot,
   wherein the cutter head is arranged to rotate relative to the cutter carrier around a cutter pivot, the advance ball carrier is arranged to rotate, relative to the cutter head, around the advance ball carrier pivot, and an axis of rotation of the cutter pivot and an axis of rotation of the advance ball carrier pivot are at a right angle to one another.

2. The cartridge of claim 1, the adjustment mechanism comprising an adjustment element and a mechanical linkage linking a displacement of the adjustment element to a displacement of the advance ball, wherein the linkage reduces the displacement by a reduction factor of at least two.

3. The cartridge according to claim 1, wherein the cartridge comprises a first housing section and second housing section movable relative to one another by operation of a locking element, the cutter being arranged to move with the first housing section, and
   movement of the locking element in a first direction causing the cutter to protrude from the second housing section in an operational position, and
   movement of the locking element in a second direction, opposite to the first direction, causing the cutter to withdraw into the second housing section into a protected position.

4. The cartridge of claim 3, further with
movement of the locking element in the first direction causing one or more locking protrusions to extend out of the cartridge, and
movement of the locking element in the second direction causing the one or more locking protrusions to withdraw into the cartridge.

5. The cartridge of claim 3, comprising the cutter carrier carrying the cutter head, the cutter head in an operational configuration being movable relative to the cutter carrier, and wherein:
movement of the locking element in the first direction causing a transport protection projection to unblock movement of cutter head relative to the cutter carrier; and
movement of the locking element in the second direction causing the transport protection projection to block movement of the cutter head relative to the cutter carrier.

6. The cartridge of claim 3, comprising at least one detent preventing relative movement between the first housing section and second housing section, the at least one detent comprising a section protruding from the cartridge, and being releasable by pushing the section protruding from the cartridge inwards.

7. A method for adapting a position of a cutter unit to a thickness of a blank arranged to be cut by a cutter, comprising the steps of:
providing the cartridge according to claim 1;
moving the cutter unit towards the blank until the cutter unit comes into contact with the blank, and thereby moves the cutter head relative to the cutter carrier;
detecting movement of the cutter unit toward the blank with a cutter head displacement sensor;
either stopping movement of the cutter unit towards the blank, or controlling the position of the cutter unit based on sensor values from the cutter head displacement sensor to reach a given relative displacement of the cutter head relative to the cutter carrier.

8. A cartridge comprising a cutter unit for carrying a cutter for cutting a phonographic record,
the cutter unit comprising a cutter carrier and a cutter head,
the cutter head being carried by the cutter carrier and arranged to be displaced relative to the cutter carrier,
the cutter unit being arranged in the cartridge enclosing and protecting the cutter unit;
wherein the cutter head is displaceable relative to the cutter carrier by cutting forces acting on the cutter and/or a weight of the cutter head, this weight being counteracted by at least one of a counterweight and a cutter spring, the cutter spring being in a pre-stressed state; and,
wherein the cutter head is arranged to rotate relative to the cutter carrier around a cutter pivot, and the cutter head being rotatable around the cutter pivot by the cutting forces acting on the cutter and/or the weight of the cutter head, this weight being counteracted by the at least one of the counterweight and the cutter spring, the cutter spring being in the pre-stressed state, and wherein the cutter spring acts on a counter arm opposite to the cutter head, relative to the cutter pivot.

9. The cartridge of claim 8, wherein a length of the cutter spring and its arrangement in relation to the cutter head is designed for the length of the cutter spring to change, when the cutter head is displaced between its two stop positions, by less than twenty-five percent.

10. The cartridge of claim 8, comprising a cutter spring regulation element arranged to displace, relative to the cutter carrier, an end portion of the cutter spring that is opposite an attachment point.

11. The cartridge of claim 8, wherein a net torque exerted by the cutter spring and the weight of the cutter head in an orientation in which it is designed to operate corresponds to a force acting against an advance ball of the cutter head and the cutter of between 0.1 N and 0.5 N.

12. A cartridge comprising a cutter unit for carrying a cutter for cutting a phonographic record,
the cutter unit comprising a cutter carrier and a cutter head,
the cutter head being carried by the cutter carrier and arranged to be displaced relative to the cutter carrier,
the cutter unit being arranged in the cartridge enclosing and protecting the cutter unit,
further comprising a cutter head displacement sensor arranged to detect a change in the displacement of the cutter head relative to the cutter carrier.

13. A cartridge comprising a cutter unit for carrying a cutter for cutting a phonographic record,
the cutter unit comprising a cutter carrier and a cutter head,
the cutter head being carried by the cutter carrier and arranged to be displaced relative to the cutter carrier,
the cutter unit being arranged in the cartridge enclosing and protecting the cutter unit,
wherein the cutter head is arranged to rotate relative to the cutter carrier around a cutter pivot, and a distance between the cutter pivot and a cutting point of the cutter is between ten cm and two cm.

14. A cartridge comprising a cutter unit for carrying a cutter for cutting a phonographic record,
the cutter unit comprising a cutter carrier and a cutter head,
the cutter head being carried by the cutter carrier and arranged to be displaced relative to the cutter carrier,
the cutter unit being arranged in the cartridge enclosing and protecting the cutter unit,
wherein a cutter bearing implementing the displacement between the cutter head and the cutter carrier, including a cutter pivot, comprises one of:
a bearing comprising a pivot, that is free of play and a damping function that is realized by a friction of the pivot, by spring-loaded conical slide-contact bearings, with an adjustable pre-tension force,
a bearing comprising a pivot, with low internal friction, comprising a roller bearing or a compliant bearing, combined with a separate damping element.

* * * * *